United States Patent [19] [11] 4,107,114
Nakayama et al. [45] Aug. 15, 1978

[54] AQUEOUS EMULSION COMPOSITIONS

[75] Inventors: Yasuharu Nakayama; Nobuhito Hirata; Yoshio Yamashita, all of Hiratsuka, Japan

[73] Assignee: Kansai Paint Company, Limited, Amagasaki, Japan

[21] Appl. No.: 731,947

[22] Filed: Oct. 13, 1976

[30] Foreign Application Priority Data

Oct. 23, 1975 [JP] Japan .............................. 50/127944

[51] Int. Cl.$^2$ ........................... C09D 3/74; C09D 5/02
[52] U.S. Cl. ................................ 260/22 CB; 260/23 P;
260/23 EP; 260/23 TN; 260/23 AR; 260/23 S;
260/23 EM; 260/29.7 UA; 260/29.7 W;
260/29.7 UP
[58] Field of Search ....... 260/23 EM, 23 P, 29.7 UA,
260/29.7 W, 29.7 UP, 22 CB, 23 AR, 23 S, 23
EP, 23 TN

[56] References Cited

U.S. PATENT DOCUMENTS

| 2,550,114 | 4/1951 | Foster | 260/23 P |
| 2,941,968 | 6/1960 | McKenna | 260/23 EM |
| 3,458,602 | 7/1969 | Pollock | 260/29.7 UA |
| 3,880,793 | 4/1975 | Nakayama | 260/29.7 W |
| 3,904,563 | 9/1975 | Shingai et al. | 260/22 CB |
| 3,933,706 | 1/1976 | Momiyama et al. | 260/23 P |
| 3,996,181 | 12/1976 | Hayashi et al. | 260/29.7 WA |

FOREIGN PATENT DOCUMENTS 2,216,175  10/1972  Fed. Rep. of Germany ..... 260/29.7 H

*Primary Examiner*—Ronald W. Griffin
*Attorney, Agent, or Firm*—Larson, Taylor and Hinds

[57] ABSTRACT

An emulsion composition prepared by subjecting a mixture of monoethylenically unsaturated monomer and polyethylenically unsaturated monomer to emulsion polymerization with use of an emulsifier, the emulsifier being a water-soluble resin having a dry oil fatty acid residue or semi-drying oil fatty acid residue, or a water-soluble petroleum resin having non-vinyl type double bonds.

21 Claims, No Drawings

AQUEOUS EMULSION COMPOSITIONS

This invention relates to emulsion compositions.

Emulsions are already known which incorporate high-molecular-weight compounds curable at ambient temperature as emulsifiers. For example, U.S. Pat. No. 2,941,968 discloses emulsions prepared with use of maleinized oils and maleinized alkyd resins. Whereas the emulsions containing such resins as emulsifiers are expected to give very tough coatings because the emulsifier itself hardens, the coating film obtained is not fully satisfactory in important properties such as hardness and resistances to water and to solvent.

It was generally believed that the unsaturated bonds contained in the emulsifier resin and the polymer prepared from an unsaturated monomer during emulsion polymerization undergo graft reaction, permitting the polymer to combine with the resin, with the result that when the emulsion is applied as a coating, the resin is cross-linked in the coating and forms a film having a high gel fraction ratio as a whole. However, our research has revealed that the inferior properties of the coating are attributable to the structure of the double bonds contained in the emulsifier which are very prone to chain transfer; the double bonds markedly reduce the molecular weight of the polymer resulting from emulsion polymerization, so that the coating requires a greatly prolonged period of time for cross linking throughout its entirety.

Attempts have been made to overcome the drawbacks. Japanese Patent Application Disclosure No. 73,488/1973, for example, discloses an emulsion prepared with use of an emulsifier which is obtained by maleinizing a petroleum resin curable at ambient temperature such as 1,2-polybutadiene to render the resin soluble in water. However, 1,2-polybutadiene contains many double bonds, is not highly resistant to weather and is expensive.

An object of this invention is to provide emulsion compositions which are free from the drawbacks of the emulsions heretofore available.

Another object of this invention is to provide emulsion compositions for forming coatings having high hardness and very resistant to water, solvents and weather.

Another object of this invention is to provide emulsion compositions which are inexpensive to produce.

Other objects and features of this invention will become apparent from the following description.

This invention provides an emulsion composition prepared by subjecting a mixture of monoethylenically unsaturated monomer and polyethylenically unsaturated monomer to emulsion polymerization with use of an emulsifier, the emulsifier being a water-soluble resin having a drying oil fatty acid residue or semi-drying oil fatty acid residue, or a water-soluble petroleum resin having non-vinyl type double bonds.

According to this invention, a mixture of monoethylenically unsaturated monomer and polyethylenically unsaturated monomer is subjected to emulsion polymerization in the presence of an emulsifier, whereby an emulsion composition is obtained which gives coatings excellent in hardness, water resistance, salt spray resistance, adhesion, solvent resistance and weather resistance. Such outstanding result is achieved especially with use of a polyethylenically unsaturated monomer as one of the unsaturated monomers to be subjected to emulsion polymerization.

Examples of the water-soluble resins having a drying or semi-drying oil fatty acid residue are neutralized products of maleinized oil, maleinized stand oil, maleinized boiled oil, maleinized fatty acid modified alkyd resin, maleinized fatty acid modified epoxy resin, maleinized fatty acid modified acrylic resin, maleinized fatty acid modified vinyl resin; fatty acid modified alkyd resin having carboxyl groups, fatty acid modified epoxy resin having carboxyl groups, fatty acid modified urethane resin having carboxyl groups, fatty acid modified acrylic resin having carboxyl groups, fatty acid modified vinyl resin having carboxyl groups; etc.

The oils and fatty acids to be used for the preparation of the water-soluble resins are preferably safflower oil, linseed oil, soybean oil, perilla oil, hemp seed oil, grape seed oil, corn oil, tall oil, cotton seed oil, walnut oil, rubber seed oil and fatty acids of these oils. Also usable are tung oil, oiticica oil, dehydrated castor oil and the fatty acids thereof. The resins prepared from these oils and fatty acids having an oil length preferably of about 15 to 95, more preferably about 25 to 80. The resins are neutralized and thereby solubilized in water. If the oil length is in the range of about 15 to about 95, the desired oxidation cross linking can be fully effected. By the term "oil length" herein used is meant the fatty acid content of the resin or the oil content thereof calculated as fatty acid.

Among the water-soluble resins given above as useful emulsifiers, neutralized products of maleinized stand oil, maleinized boiled oil, maleinized fatty acid modified epoxy resin, maleinized fatty acid modified acrylic resin, maleinized fatty acid modified vinyl resin, fatty acid modified acrylic resin having carboxyl groups and fatty acid modified vinyl resin having carboxyl groups have not been known as being usable as emulsifiers for emulsion polymerization. Use of these resins as emulsifiers gives emulsion compositions having more excellent properties than when maleinized oil and other known emulsifiers are used.

The water-soluble petroleum resins useful in this invention are neutralized maleates or fumarates of the petroleum resins, the petroleum resins being homopolymers of diene monomers having 4 to 8 carbon atoms, copolymers of such diene monomers and another polymerizable unsaturated monomers, and modified products of these homopolymers and/or copolymers. The petroleum resins preferably contain a reduced amount of up to about 70% of vinyl type double bonds ($-CH=CH_2$) based on the total amount of the double bonds contained therein. In other words, the resins preferably contain at least about 30% of non-vinyl type double bonds ($-CH=CH-$) based on the total amount of the double bonds. Examples of the useful diene monomers with 4 to 8 carbon atoms are butadiene, pentadiene, cyclopentadiene, hexadiene, heptadiene, octadiene, etc. Examples of the monomers to be copolymerized with these diene monomers are olefins having 2 to 8 carbon atoms, styrene, α-methylstyrene, vinyltoluene, acrylonitrile, methacrylonitrile, chloroprene, acrylates or methacrylates of alcohols having 1 to 18 carbon atoms and other usual unsaturated monomers. The petroleum resins may be modified by for example cyclization, epoxidization, hydrogenation, hydroxylation, etc. According to this invention, the petroleum resins or the modified products thereof are maleinized or fumarinized and then solubilized in water by neutralization for use as emulsifiers. The maleinization or fumarinization is conducted by known methods. For instance, the petroleum resins are reacted with maleic acid, maleic anhydride or fumaric acid at about 120° to about 250° C.

Examples of useful neutralizing agents for the preparation of the emulsifiers are ammonia, amines, alkali metal compounds such as sodium hydroxide, potassium hydroxide, etc. Prior to the neutralization, the emulsifier resins have an acid value of preferably about 20 to about 350, more preferably about 40 to about 250. When the acid value is in the range of about 20 to about 350, the resins have good solubility in water, giving coatings having high resistance to water. The emulsifiers are used in such amount that the solids of the emulsion have an acid value preferably of about 5 to about 150, more preferably about 10 to about 50.

Of the two types of the emulsifiers to be used in this invention, the water-soluble resins having a drying or semi-drying oil fatty acid residue have greater chain transfer activity in radical polymerization. Accordingly, use of the water-soluble resins as the emulsifiers enhances the effect achieved by the use of the polyethylenically unsaturated monomer to a great extent than the other petroleum resins emulsifiers. Further in this case, the resulting emulsion does not contain an excess amount of double bonds, while each double bond contained therein has high activity, ensuring full cross linking. Thus the water-soluble resins are preferable to use in preparing emulsions which will give tough and weather-resistant coatings.

In subjecting the monoethylenically unsaturated monomer to emulsion polymerization in the presence of the emulsifier described above, this invention is characterized in that a polyethylenically unsaturated monomer is used conjointly with the monoethylenically unsaturated monomer. For this purpose, a wide variety of monoethylenically unsaturated monomers are usable but, as is the case with the usual emulsion polymerization, monomers which are not very hydrophilic are preferable. Since the emulsifiers have high radical activity in this invention, it is preferable to use monomers which will not give active radicals. Examples of useful monoethylenically unsaturated monomers are:

esters represented by the formula $CH_2=C(R_1)COOR_2$ wherein $R_1$ is hydrogen or $CH_3$, and $R_2$ is alkyl having 1 to 26 carbon atoms;

esters represented by the formula $CH_2=C(R_1)COOR_3$ wherein $R_1$ is as defined above, $R_3$ is

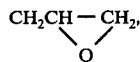

$CH_2CH(OH)CH_2OCOR_4$, $(CH_2CH_2O)_nR_5$, $[CH_2CH(CH_3)O]_nR_5$, $CH_2CH(CH_3)OH$ or $CH_2CH_2CH_2OH$, $R_4$ is hydrogen or alkyl having 1 to 25 carbon atoms, $R_5$ is alkyl having 1 to 8 carbon atoms, and $n$ is an integer of 1 to 8;

styrene, vinyltoluene, α-methylstyrene, methacrylonitrile, hydroxyethyl methacrylate, N-butoxymethyl acrylamide, vinyl acetate and VeoVa monomers (trade mark of vinyl ester of synthetic tertiary carboxylic acid, product of Shell Chemical Co., U.S.A., general formula:

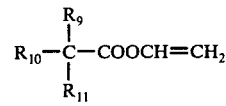

wherein $R_9$, $R_{10}$ and $R_{11}$ are alkyl and at least one of them is $CH_3$).

These monoethylenically unsaturated monomers are used singly, or at least two of them are used conjointly. Furthermore, such monoethylenically unsaturated monomer is used conjointly with up to 20% by weight, preferably up to 10% by weight, of water-soluble or hydrophilic monoethylenically unsaturated monomer based on the weight of the former.

Examples of the latter monomers are:

carboxylic acids represented by the formula $CH_2=C(R_6)COOH$ wherein $R_6$ is hydrogen or $CH_3$;

carboxylic acid amides represented by the formula $CH_2=C(R_6)CONHR_7$ wherein $R_6$ is as defined above, and $R_7$ is hydrogen, $-CH_2OH$ or $-CH_2OC_4H_9$;

compounds represented by the formula $CH_2=CHR_8$ wherein $R_8$ is CN or CHO; and N-methylacrylamide, N-ethylacrylamide, dimethylaminoethyl methacrylate, diethylaminoethyl methacrylate, hydroxyethyl acrylate, itaconic acid, vinylpyridine and vinylpyrrolidone.

The polyethylenically unsaturated monomers to be used in this invention are those having at least two, preferably 2 to 4, polymerizable double bonds.

Examples are:

esters of (a) polyhydric alcohols having 2 to 4 functional groups and (b) acrylic acid or methacrylic acid;

esters of (c) glycidyl acrylate or glycidyl methacrylate and (d) acrylic acid or methacrylic acid;

esters of (e) polycarboxylic acids having 2 to 4 functional groups and (f) glycidyl acrylate, glycidyl methacrylate, hydroxyethyl acrylate, hydroxyethyl methacrylate, hydroxypropyl acrylate or hydroxypropyl methacrylate;

adducts of (g) polyepoxy compounds or polyisocyanate compounds having 2 to 4 functional groups respectively and (h) acrylic acid, methacrylic acid, hydroxyethyl acrylate, hydroxyethyl methacrylate, hydroxypropyl acrylate or hydroxypropyl methacrylate;

divinylbenzene;

adducts of (i) relatively low-molecular-weight epoxy polymers having a number average molecular weight of up to 2000, preferably up to 500 or polymers containing hydroxyl, epoxy or carboxyl having the similar molecular weight as above and (j) acrylic acid, methacrylic acid, glycidyl acrylate, glycidyl methacrylate, hydroxyethyl acrylate hydroxyethyl methacrylate, hydroxypropyl acrylate or hydroxypropyl methacrylate; etc.

According to this invention, the polyethylenically unsaturated monomer is used in an amount of preferably about 0.1 to about 20% by weight, more preferably about 1 to about 10% by weight, based on the monomers used. When the amount of the polyethylenically unsaturated monomer is within the above-mentioned range of about 0.1 to about 20% by weight, gelation is greatly inhibited within the emulsion particles, permitting the particles to cohere satisfactorily when the emulsion is applied as coatings. Consequently smooth coating films can be obtained which are outstanding in various properties such as hardness, resistance to water, solvents and weather and the like.

The emulsion polymerization for preparing the emulsion compositions of this invention may be carried out by usual known methods. Generally the polymerization is conducted with stirring. After the monomer has been emulsified with stirring, the reaction system may be further processed in a stationary state. It is not always necessary to use a polymerization initiator, but such agent may be used in a usual manner to effect the polymerization promptly. Any of radical-producing initiators may be used for this purpose. Generally initiators of the peroxide type and azo type are useful. The concentration of the solids in the emulsion composition is preferably about 15 to about 65% by weight.

The emulsions obtained according to this invention are used as coating compositions which are curable at ambient temperature. However they are also useful as coating compositions which are cured by baking. They are also usable for a wide variety of applications for example for processing resins. Even when singly used, the emulsions of this invention give coatings which are outstanding in resistance to water, corrosion and weather and in adhesiveness. They are also usable in admixture with other water-soluble resins to improve the properties of the resulting coatings.

This invention will be described below in greater detail with reference to Examples and Comparison Examples, in which the parts and percentages are all by weight unless otherwise specified.

EXAMPLE 1

A 11.1 g quantity of maleate of stand linseed oil having an acid value of 87.6, 3.9 g of ethylene glycol monobutyl ether, 1.0 g of 29% ammonia water and 53.7 g of tap water are thoroughly stirred to prepare a solution, to which 0.07 g of ammonium persulfate and 1.4 g of tap water are thereafter added. Subsequently a mixture of 28.1 g of n-butyl methacrylate and 0.7 g of 1,6-hexanediol diacrylate is added at a time to the resulting mixture, and the mixture is thoroughly stirred and then heated to 80° C. The mixture is thereafter allowed to stand for 2 hours, whereby an emulsion is obtained.

COMPARISON EXAMPLE 1

An emulsion is prepared in the same manner as in Example 1 except that the 1,6-hexanediol diacrylate is replaced by n-butyl methacrylate.

EXAMPLE 2

An emulsion is prepared in the same manner as in Example 1 except that the 1,6-hexanediol diacrylate is replaced by the same amount of divinylbenzene.

EXAMPLE 3

An emulsion is prepared in the same manner as in Example 1 except that the maleate of stand linseed oil is replaced by a maleinized fatty acid modified copolymer of styrene and allyl alcohol having an acid value of 105.

This resin is prepared from the following mixture.

| | |
|---|---|
| Styrene-allyl alcohol copolymer (molecular weight:1140, OH content:7.5%) | 547 g |
| Linseed oil fatty acid | 635 |
| Xylene | 61 |
| Dibutyltin oxide | 1.1 |

The mixture is subjected to esterifying reaction with heating at 230° C for 9 hours and dehydrated to obtain a polymer having an acid value of 5.3. To the polymer is added 144 g of maleic anhydride. The mixture is heated at 180° to 200° C for 3 hours and the excess maleic anhydride and the solvent are removed at reduced pressure. To the purified mass is added 50 g of water, and the mixture is reacted at 100° C for 2 hours for ring cleavage, whereby a resin having an acid value of 105 is obtained.

COMPARISON EXAMPLE 2

An emulsion is prepared in the same manner as in Example 3 except that 1,6-hexanediol diacrylate is not used.

EXAMPLE 4

A 660 g quantity of polypentadiene (molecular weight:about 2000), 137.5 g of maleic anhydride, 552 g of cyclohexyl acetate and 6 g of dimethylformamide are placed into a 2-liter four-necked flask and heated at 180° to 185° C in a nitrogen atmosphere for 4 hours. The excess maleic anhydride and solvent are removed at reduced pressure, 20 g of water added to the residue, the mixture subjected to ring cleavage reaction, and the product obtained in the form of an ethylene glycol monobutyl ether solution, whereby a resin is obtained having a concentration of 76.5% and an acid value of 109.

A mixture of 209 g of the maleinized polypentadiene solution (solids:160 g) and 10 g of ethylene glycol monobutyl ether is neutralized with 28% ammonia water to 0.95 equivalent of the carboxyl groups in the resin. The neutralized mixture is thoroughly dissolved in 773 g of water. A solution of one g of ammonium persulfate in 20 g of water is then added to the solution. Subsequently a mixture of 406 g of butyl methacrylate and 8 g of 1,6-hexanediol diacrylate is added to the mixture. The resulting mixture is reacted at 80° C for 2 hours with full stirring, whereby an emulsion is obtained.

COMPARISON EXAMPLE 3

An emulsion is prepared in the same manner as in Example 4 except that the 1,6-hexanediol diacrylate is replaced by n-butyl methacrylate.

EXAMPLE 5

A 507 g quantity of phthalic anhydride, 656 g of pentaerythritol, 2046 g of linseed oil fatty acid, 514 g of benzoic acid, 7 g of di-n-butyltin oxide and 150 g of xylene are placed into a 5-liter four-necked flask and heated at 230° C in a nitrogen atmosphere for 5.5 hours to obtain a fatty acid modified alkyd resin having an acid value of 4.7. To the alkyd resin solution is added 347 g of maleic anhydride and the mixture is maleinized at 190 to 200° C for 5 hours. The excess maleic anhydride and xylene are removed at reduced pressure, 86 g of water added to the residue, and the mixture subjected to ring cleavage reaction, whereby a maleinized fatty acid modified alkyd resin is obtained having a total acid value of 80.

A 111 g quantity of the maleinized fatty acid modified alkyd resin, 39 g of ethylene glycol monobutyl ether, 4.6 g of 29% ammonia water, 8 g of triethylamine and 535 g of tap water are throroughly stirred to prepare a solution, to which 0.7 g of ammonium persulfate and 14 g of tap water are thereafter added. Subsequently a mixture of 281 g of n-butyl methacrylate and 7 g of 1,6-hexanediol diacrylate is added at a time to the resulting mixture, and the mixture is thoroughly stirred and then heated to 80° C. The mixture is thereafter allowed to stand for 2 hours, whereby an emulsion is obtained.

COMPARISON EXAMPLE 4

An emulsion is prepared in the same manner as in Example 5 except that the 1,6-hexanediol diacrylate is replaced by n-butyl methacrylate.

EXAMPLE 6

A 507 g quantity of phthalic anhydride, 656 g of pentaerythritol, 1023 g of soybean oil fatty acid, 1023 g of linseed oil fatty acid, 514 g of benzoic acid, 7 g of di-n-butyltin oxide and 150 g of xylene are placed into a 5-liter four-necked flask and heated at 230° C in a nitrogen atmosphere for 6 hours to obtain a fatty acid modified alkyd resin having an acid value of 5.5. To the alkyd resin solution is added 424 g of maleic anhydride and the mixture is maleinized at 190° to 200° C for 6 hours. The excess maleic anhydride and xylene are removed at reduced pressure, 110 g of water added to the residue, and the mixture subjected to ring cleavage reaction, whereby a maleinized fatty acid modified alkyd resin is obtained having a total acid value of 92.

A 111 g quantity of the maleinized fatty acid modified alkyd resin, 39 g of ethylene glycol monobutyl ether, 5.3 g of 29% ammonia water, 9.1 g of triethylamine and 532 g of tap water are thoroughly stirred to prepare a solution, to which 0.7 g of ammonium persulfate and 14 g of tap water are thereafter added. Subsequently a mixture of 168 g of styrene, 114 g of 2-ethylhexyl acrylate and 7 g of 1,6-hexanediol diacrylate is added at a time to the resulting mixture, and the mixture is thoroughly stirred and then heated to 80° C. The mixture is thereafter allowed to stand for 2 hours, whereby an emulsion is obtained.

COMPARISON EXAMPLE 5

An emulsion is prepared in the same manner as in Example 6 except that the 1,6-hexanediol diacrylate is replaced by n-butyl methacrylate.

EXAMPLE 7

A 1641 g quantity of the same styrene-allyl alcohol copolymer as used in Example 3, 2028 g of safflower oil fatty acid, 1.5 g of di-n-butyltin oxide and 100 g of xylene are placed into a 5-liter four-necked flask and heated at 230° C in a nitrogen atmosphere for 6 hours to obtain a fatty acid modified vinyl resin having an acid value of 2. To the vinyl resin solution is added 454 g of maleic anhydride and the mixture is maleinized at 190° to 200° C for 4 hours. The excess maleic anhydride and xylene are removed at reduced pressure, 120 g of water added to the residue, and the mixture subjected to ring cleavage reaction, whereby a maleinized fatty acid modified vinyl resin is obtained having a total acid value of 113.

A 111 g quantity of the maleinized fatty acid modified vinyl resin, 39 g of etylene glycol monobutyl ether, 13 g of 29% ammonia water and 534 g of tap water are thoroughly stirred to prepare a solution, to which 0.7 g of ammonium persulfate and 14 g of tap water are thereafter added. Subsequently a mixture of 281 g of n-butyl methacrylate and 7 g of mixture of dimethacrylate and trimethacrylate of glycerin, etc. (trade mark "Blemmer GP", product of Nippon Oils and Fats Co., Ltd., Japan) is added at a time to the resulting mixture, and the mixture is thoroughly stirred and then heated to 80° C. The mixture is thereafter allowed to stand for 2 hours, whereby an emulsion is obtained.

COMPARISON EXAMPLE 6

An emulsion is prepared in the same manner as Example 7 except that the "Blemmer GP" is replaced by n-butyl methacrylate.

Table 1 shows the properties of the emulsion compositions obtained in Examples 1 to 7 and Comparison Examples 1 to 6. Each of the emulsion compositions is applied by a bar coater to a polished mild steel panel to a film thickness of 25 to 30 μ, and the coating was tested for properties. Table 2 shows the results.

Table 2 indicates that the coatings formed from the emulsions of Examples have a high gel fraction ratio and high toughness. The polymerization degrees and the particle sizes of the emulsions also reveal that the polymerization has been effected smoothly.

The properties of the emulsion and the properties of the coating are determined by the following methods.

(1) Tolerance:

The composition is placed into a glass container on newspaper. The tolerance is expressed in terms of the maximum thickness of the layer of the composition through which No. 12 types on the newspaper are legible.

(2) Polymerization degree:

The emulsion is dried in a vacuum dryer at 130° C for 2 hours, and the weight of the residue is measured to calculate the polymerization degree.

(3) Viscosity:

Water is removed from the emulsion, and the remaining mass is dissolved in ethylene glycol monobutyl ether. The viscosity of the solution (solid content:15%) is measured at 25° C.

(4) Resistance to water:

The coating is immersed in water at 20° C for 2 days and is thereafter checked for changes.

(5) Resistance to gasoline:

The coating is immersed in gasoline (trade mark, "Silver Gasoline", product of Nippon Oil Co., Ltd., Japan) at 20° C for 30 minutes and is thereafter checked for changes.

(6) Resistance to salt spray:

According to JIS Z 2371. After testing for one day, the width of the resulting rust from the cut portion is measured.

(7) Pencil scratch hardness:

The coating is scratched with pencils ("Mitsubishi Uni-Pencil", 6B to 9H in hardness). The result is given in terms of the pencil hardness one degree below the hardness at which scratches are formed on the coating.

(8) Adhesiveness:

One hundred squares, 1 mm × 1 mm, are formed by a knife in the coating by cross cutting, a cellophane tape is adhered to the coat coating and then peeled off quickly, and the number (n) of the squares remaining on the panel was counted. Adhesiveness is expressed by n/100.

(9) Gel fraction ratio:

Calculated from the difference in the weight of coating before and after the coating is extracted with tetrahydrofuran.

(10) Gloss retentivity:

Lead naphthenate and cobalt naphthenate are added in amounts of 0.45% and 0.05% respectively, calculated as the corresponding metals, to water-soluble acrylic resin (having an acid value of 85 and oil length of 27 calculated as fatty acid content and composed of styrene and n-butyl methacrylate) which is curable at ambient temperature. Titanium dioxide is then dispersed in the mixture, and the dispersion is admixed, in an amount of 30 PHR (part per hundred resin) calculated as the acrylic resin, with the emulsions of this invention respectively, the amount of the dispersed titanium dioxide being 80 PHR based on the total resin solids of the mixture finally prepared.

The resulting composition is applied to a coating of oil-based primer (JIS-K-5621) and the coated panel is tested for 250 hours on a weather-ometer of the sunshine type, and the coatings are thereafter checked for gloss retentivity.

functional groups and (f) glycidyl acrylate glycidyl methacrylate, hydroxyethyl acrylate, hydroxyethyl methacrylate, hydroxypropyl acrylate or hydroxy propyl methacrylate; adducts of (g) polyepoxy compounds or polyisocyanate compounds having 2 to 4 functional groups respectively and (h) acrylic acid, methacrylic acid, hydroxyethyl acrylate, hydroxyethyl methacrylate, hydroxypropyl acrylate or hydroxy propyl methacrylate; divinylbenzene; and adducts of (i) relatively low-molecular-weight epoxy polymers having a number average molecular weight of up to 2000, or polymers containing hydroxyl, epoxy or carboxyl having the similar molecular weight as above and (j) acrylic acid, methacrylic acid, glycidyl acrylate, glycidyl meth- Table 1

| Properties of emulsion | Example | | | | | | | Comp. Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Solid content (%) | 39.6 | 39.0 | 39.9 | 39.8 | 39.6 | 40.3 | 39.8 | 37.5 | 39.9 | 39.8 | 39.5 | 40.0 | 40.0 |
| Viscosity (poises) (on B-type viscosimeter at 12 rpm and 20° C) | 15.5 | 12.0 | 5.0 | 40 | 1.5 | 94 | 44 | 6.8 | 2.8 | 55 | 3.0 | 40 | 13 |
| Particle size (μ) | 0.35 | 0.40 | 0.10 | 0.05 | 0.09 | 0.45 | 0.20 | 0.6 | 0.15 | 0.05 | 0.16 | 0.28 | 0.18 |
| Tolerance 1) (mm) | 1.2 | 1.2 | 3.6 | 2.5 | 6.5 | 0.4 | 2.75 | 0.3> | 1.35 | 2.4 | 1.2 | 1.0 | 3.0 |
| Polymerization degree 2) (%) | 100 | 97.0 | 100 | 100 | 100 | 100 | 100 | 94.5 | 100 | 100 | 100 | 100 | 100 |
| Viscosity of emulsion as dissolved in ethylene glycol monobutyl ether 3) | I | O | Z | Z | $Z_1$ | Z | $Z_2$ | $A_1$ | J | O | K | L | J |

Table 2

| Properties of coating after drying for 7 days | Resistance to water 4) | Resistance to gasoline 5) | Resistance to salt spray 6) (mm) | Pencil scratch hardness 7) | Adhesiveness 8) | Gel fraction ratio (%) 9) | Weather-ometer gloss retentivity (%) 10) |
|---|---|---|---|---|---|---|---|
| Example | | | | | | | |
| 1 | No change | Slightly blistered | 2.0 | B | 100/100 | 43.1 | 85 |
| 2 | No change | Slightly blistered | 2.0 | B | 100/100 | 40.0 | 85 |
| 3 | No change | No change | 2.0 | HB | 100/100 | 90.0 | 86 |
| 4 | Slightly turned white | Swelled | 10 | HB | 100/100 | 20 | 60 |
| 5 | No change | No change | 1.0 | B | 100/100 | 79 | 90 |
| 6 | No change | No change | 1.0 | B | 100/100 | 75.4 | 88 |
| 7 | No change | No change | 2.0 | F | 100/100 | 89 | 90 |
| Comp. Example | | | | | | | |
| 1 | Turned white | Dissolved | 1.5 | 2B | 100/100 | 0 | 80 |
| 2 | Slightly turned white | Swelled | 3.0 | B | 100/100 | 50.7 | 80 |
| 3 | Turned white | Dissolved | Rusted* | B | 100/100 | 1 | 40 |
| 4 | Turned white | Very slightly blistered | 1.0 | B | 100/100 | 20 | 80 |
| 5 | Turned white | Slightly swelled | 1.0 | B | 100/100 | 15 | 75 |
| 6 | Slightly turned white | Swelled | 2.0 | HB | 100/100 | 20 | 80 |

Note: *Rust developed over the entire surface of test panel.

What we claim is:

1. An aqueous emulsion composition prepared by subjecting a mixture of monoethylenically unsaturated monomer and polyethylenically unsaturated monomer to emulsion polymerization with use of an emulsifier, the emulsifier being a water-soluble resin having a drying oil fatty acid residue or semi-drying oil fatty acid residue, or a water-soluble petroleum resin having non-vinyl double bonds, wherein said polyethylenically unsaturated monomer has 2 to 4 polymerizable double bonds and is at least one compound selected from the group consisting of: esters of (a) polyhydric alcohols having 2 to 4 functional groups and (b) acrylic acid or methacrylic acid; esters of (c) glycidyl acrylate or glycidyl methacrylate and (d) acrylic acid or methacrylic acid; esters of (e) polycarboxylic acids having 2 to 4 acrylate, hydroxyethyl acrylate, hydroxyethyl methacrylate, hydroxypropyl acrylate or hydroxypropyl methacrylate, said monoethylenically unsaturated monomer is at least one compound selected from the group consisting of: esters represented by the formula:

$CH_2=C(R_1)COOR_2$ wherein $R_1$ is hydrogen or $CH_3$, and R2 is alkyl having 1 to 26 carbon atoms:

esters represented by the formula:

$CH_2=C(R_1)COOR_3$ wherein $R_1$ is as defined above, $R_3$ is

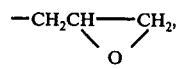

—$CH_2CH(OH)CH_2OCOR_4$, —$(CH_2CH_2O)_nR_5$, $[CH_2CH(CH_3)O]$ $nR_5$, —$CH_2CH(CH_3)OH$ or $CH_2CH_2CH_2OH$, $R_4$ is hydrogen or alkyl having 1 to 25 carbon atoms, $R_5$ is alkyl having 1 to 8 carbon atoms, and $n$ is an integer of 1 to 8; and styrene, vinyltoluene, α-methylstyrene, methacrylonitrile, hydroxyethyl methacrylate and N-butoxy-methyl acrylamide, vinyl acetate and vinyl monomers, having general formula:

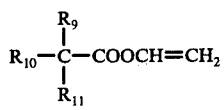

(wherein $R_9$, $R_{10}$ and $R_{11}$ are alkyl and at least one of them is $CH_3$), and said polyethylenically unsaturated monomer is used in an amount of about 0.1 to about 20% by weight of all the monomers used.

2. An aqueous emulsion composition as defined in claim 1 wherein the emulsifier is a water-soluble resin having a drying oil fatty acid residue or semi-drying oil fatty acid residue.

3. An aqueous emulsion composition as defined in claim 2 wherein the water-soluble resin is at least one neutralized product selected from the group consisting of maleinized oil, maleinized stand oil, maleinized boiled oil, maleinized fatty acid modified alkyd resin, maleinized fatty acid modified epoxy resin, maleinized fatty acid modified acrylic resin, maleinized fatty acid modified vinyl resin, fatty acid modified alkyd resin having carboxyl groups, fatty acid modified epoxy resin having carboxyl groups, fatty acid modified urethane resin having carboxyl groups, fatty acid modified acrylic resin having carboxyl groups and fatty acid modified vinyl resin having carboxyl groups.

4. An aqueous emulsion composition as defined in claim 3 wherein the water-soluble resin is at least one neutralized product selected from the group consisting of maleinized stand oil, maleinized boiled oil, maleinized fatty acid modified epoxy resin, maleinized fatty acid modified acrylic resin, maleinized fatty acid modified vinyl resin, fatty acid modified acrylic resin having carboxyl groups and fatty acid modified vinyl resin having carboxyl groups.

5. An aqueous emulsion composition as defined in claim 2 wherein the compound used to introduce the drying oil fatty acid residue or the semi-drying oil fatty acid residue into the water-soluble resin is at least one member selected from the group consisting of safflower oil, linseed oil, soybean oil, perilla oil, hemp seed oil, grape seed oil, corn oil, tall oil, cotton seed oil, walnut oil, rubber seed oil, tung oil, oiticica oil and dehydrated castor oil and the fatty acids of the oils.

6. An aqueous emulsion composition as defined in claim 2 wherein the water-soluble resin has an oil length of about 15 to 95 calculated as a fatty acid content.

7. An aqueous emulsion composition as defined in claim 6 wherein the oil length is about 25 to 80.

8. An aqueous emulsion composition as defined in claim 1 wherein the emulsifier is a water-soluble petroleum resin having non-vinyl double bonds.

9. An aqueous emulsion composition as defined in claim 8 wherein the amount of the non-vinyl double bonds is at least 30% based on the total amount of the double bonds contained in the resin.

10. An aqueous emulsion composition as defined in claim 8 wherein the petroleum resin is a homopolymer of diene monomer having 4 to 8 carbon atoms, a copolymer of the diene monomer and another polymerizable unsaturated monomer, or a cyclized, epoxidized, hydrogenated or hydroxylated product of the homopolymer and/or the copolymer.

11. An aqueous emulsion composition as defined in claim 10 wherein the diene is at least one compound selected from the group consisting of butadiene, petadiene, cyclopentadiene, hexadiene, heptadiene and octadiene.

12. An aqueous emulsion composition as defined in claim 10 wherein the another polymerizable unsaturated monomer is at least one compound selected from the group consisting of olefins having 2 to 8 carbon atoms, styrene, α-methyl-styrene, vinyltoluene, acrylonitrile, methacrylonitrile, chloroprene and acrylates or methacrylates of alcohols having 1 to 18 carbon atoms.

13. An aqueous emulsion composition as defined in claim 1 wherein the emulsifier resin has an acid value of about 20 to about 350 prior to neutralization.

14. An aqueous emulsion composition as defined in claim 13 wherein the acid value prior to neutralization is about 40 to about 250.

15. An aqueous emulsion composition as defined in claim 1 wherein the monoethylenically unsaturated monomer is used conjointly with at least one water-soluble or hydrophilic monoethylenically unsaturated monomer selected from the group consisting of:
carboxylic acids represented by the formula $CH_2=C(R_6)COOH$ wherein $R_6$ is hydrogen or $CH_3$;
carboxylic acid amides represented by the formula $CH_2=C(R_6)CONHR_7$ wherein $R_6$ is as defined above, and $R_7$ is hydrogen, —$CH_2OH$ or —$CH_2OC_4H_9$;
compounds represented by the formula $CH_2=CHR_8$ wherein $R_8$ is CN or CHO; and
N-methylacrylamide, N-ethylacrylamide, dimethylaminoethyl methacrylate, diethylaminoethyl methacrylate, hydroxyethyl acrylate, itaconic acid, vinylpyridine and vinylpyrrolidone, the amount of the latter water-soluble or hydrophilic monomer being up to 20% by weight based on the weight of the former monomer.

16. An aqueous emulsion composition as defined in claim 15 wherein the amount of the water-soluble or hydrophilic unsaturated monomer is up to 10% by weight.

17. An aqueous emulsion composition as defined in claim 1 wherein the polyethylenically unsaturated monomer has 2 to 4 polymerizable double bonds.

18. An aqueous emulsion composition as defined in claim 1 wherein the amount of the polyethylenically unsaturated monomer is about 1 to about 10% by weight of all the monomers used.

19. An aqueous emulsion composition as defined in claim 1 wherein the emulsifier is used in such a proportion that the solids in the resulting emulsion have an acid value of about 5 to about 150.

20. An aqueous emulsion composition as defined in claim 19 wherein the acid value is about 10 to about 50.

21. An aqueous emulsion composition as defined in claim 1 wherein the emulsion has a solid concentration of about 15 to about 65% by weight.

* * * * *